United States Patent

Hull et al.

[11] 3,845,524
[45] Nov. 5, 1974

[54] COUPLING DEVICE FOR SEAT BELTS

[75] Inventors: Neil A. Hull, Birmingham; Richard E. Peel, Farmington Hills, both of Mich.

[73] Assignee: Ford Motor Company, Dearborn, Mich.

[22] Filed: Jan. 4, 1974

[21] Appl. No.: 430,810

[52] U.S. Cl. .......... 24/222 R, 24/224 LS, 24/230 R, 297/389
[51] Int. Cl. ...................... A44b 17/00, A44b 11/25
[58] Field of Search ...... 24/222 R, 222 GF, 224 LS, 24/224 R, 224 BW; 297/389

[56] References Cited
UNITED STATES PATENTS
3,542,426  11/1970  Radke ................................ 297/389
3,790,209  2/1974  Littmann ........................... 297/389

Primary Examiner—Bernard A. Gelak
Attorney, Agent, or Firm—Keith L. Zerschling; John J. Roethel

[57] ABSTRACT

A coupling device for connecting a shoulder harness to a lap belt, the coupling device having a plate carrying a post adapted to engage a retention slot in a tongue. The improvement comprises a rotation limiting device engaged with the post and having a leg portion projecting through the slot in the tongue. The leg portion abuts appropriate edges of the plate to limit the rotatability about the post of the plate relative to the tongue.

5 Claims, 3 Drawing Figures

COUPLING DEVICE FOR SEAT BELTS

BACKGROUND OF THE INVENTION

U.S. Pat. No. 3,542,426 issued to Donald G. Radke on Nov. 24, 1970 for a "Shoulder Harness Connector" discloses the principle features of a coupling for connecting a shoulder belt to a pair of lap belts of a vehicle seatbelt system. Radke discloses a tongue connected to a lap belt segment and a plate connected to a shoulder harness. The tongue carries a post and the plate carries a slot adapted to interlockingly receive the post, the tongue and plate being free to swivel relative to one another through 360° or more of rotation. Such an arrangement has an undesirable tendency for the shoulder harness to twist or rope relative to the lap belt segment to which it is connected when the lap belt segments are unbuckled from each other. Since a twisted or roped shoulder harness is uncomfortable to wear, it becomes necessary for the seat occupant to disengage the plate and tongue to straighten the harness, a somewhat annoying manipulation.

It is an object of the present invention to provide a simple, snap-on, rotation limiting device which effectively will limit relative rotation of the plate and tongue about the post to much less than a full turn or twist, thereby effectively preventing twisting or roping of the shoulder harness.

SUMMARY OF THE INVENTION

The present invention relates to a coupling device for connecting a shoulder harness to a lap belt. The coupling device includes a plate adapted to be connected to one end of a shoulder harness and a tongue adapted to be connected to one end of a lap belt segment. The plate has a substantially triangular end portion with an upstanding post at the apex of the triangle, the post having an enlarged head. The tongue has a retention slot intermediate its ends adapted to have interlocking engagement with the post.

(It will be noted that U.S. Pat. No. 3,542,426 discloses the post on the tongue and the slot in the plate. The present disclosure inverts the relationship without affecting the principle of operation.)

The improved feature embodied in the present invention is a rotation limiting device having retention means substantially paralleling the plate and engaged with the post. The rotation limiting device has an angularly related leg portion adapted to project through the slot in the tongue. The leg portion is relatively movable around the plate triangular end portion for engagement with the side edges of the latter to limit the rotatability or swivelling movement about the post of the plate relative to the tongue.

Preferably, the rotation limiting device is a formed spring wire clip.

DESCRIPTION OF THE DRAWINGS

Further features and advantages of the present invention will be made more apparent as this description proceeds, reference being had to the accompanying drawing, wherein.

DETAILED DESCRIPTION OF THE INVENTION

Figure 1:
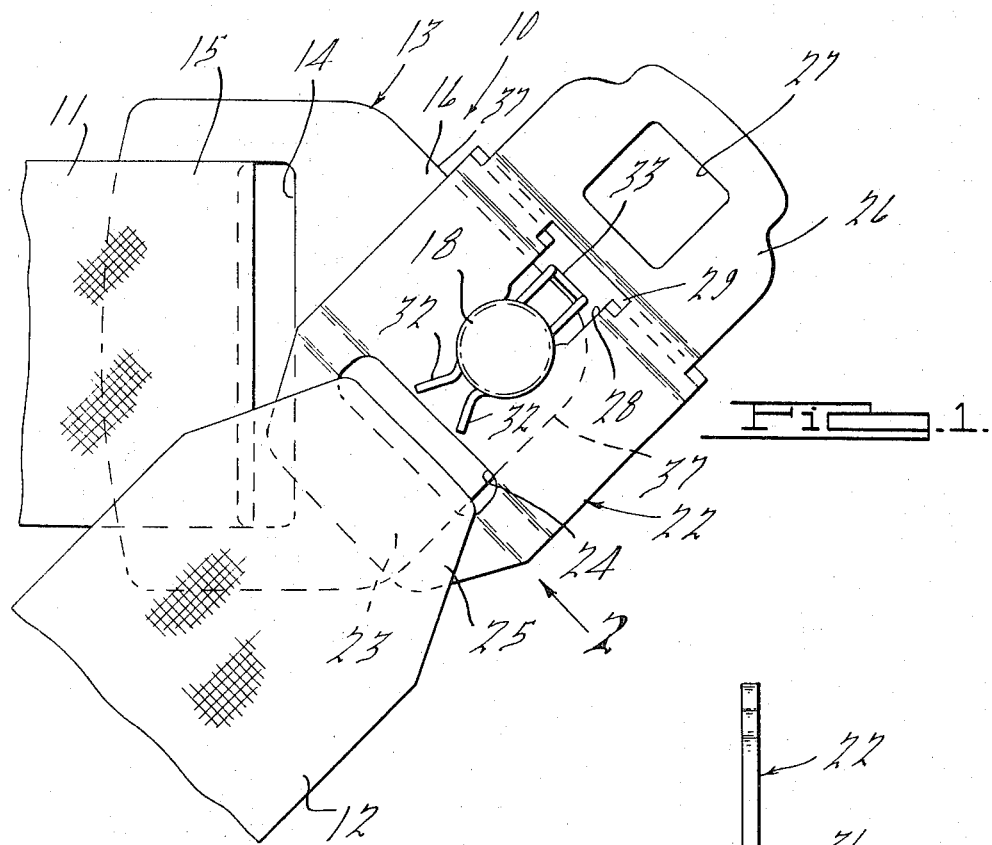
FIG. 1 is a plan view of the coupling device embodying the present invention shown in an inverted position compared to its position of actual use as part of a vehicle seat belt system.

Referring to the drawing, FIG. 1 shows a coupling device, generally designated 10, for coupling a shoulder harness 11 to a lap belt segment 12. The coupling device 10 is shown as it would appear from the underside when in use since this more clearly illustrates the present invention. The coupling device 10 includes a plate 13 having a laterally extending slot 14 receiving the terminal loop end 15 of the shoulder harness. The end 16 of the plate opposite the slot 14 end is substantially triangular in shape and carries a post 17 having an enlarged head 18 and a neck (not visible) which supports the head in spaced relation to the surface 19 of the plate 13. Preferably, an annular collar 21 of resilient material is carried about the neck of the post 17 between the head 18 and plate surface 19.

The coupling device 10 also includes a tongue 22 having an end portion 23 slotted at 24 to receive the terminal end portion 25 of the lap belt segment 12. The opposite end portion 26 of the tongue 22 is adapted to be inserted into a conventional buckle device, not shown, for latching engagement of its latching aperture 27. The tongue 22 has a longitudinally extending slot 28 having at the latching end 26 of the buckle a lateral enlargement 29 through which the post head 18 may be slipped. The end of the slot 28 opposite the enlargement 29 is circular (not visible) and of a diameter slightly smaller than the diameter of the neck and collar 21 on the post 17 and is formed as a socket to releasably retain the plate 13 in coupled relation to the tongue 22. This is conventional structure substantially as more fully described in the aforementioned U.S. Pat. No. 3,542,426.

The post 17 is freely rotatable in the socket at the end of slot 28 which means that the plate 13 is freely rotatable relative to the tongue 22. Because of this the shoulder harness 11 when left connected to the lap belt segment 12 with the tongue 22 disconnected from its buckle has an undesirable tendency to twist or rope. In order to straighten the harness, its plate 13 must be disconnected from the tongue 22. This manipulation of the harness is found to be a nuisance and frequently the harness is left disconnected to avoid the bother involved.

Figure 3:
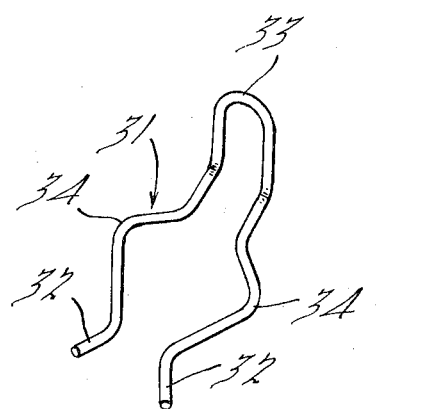
FIG. 3 is an enlarged view of a preferred form of a rotation limiting device embodying the present invention.
Figure 2:
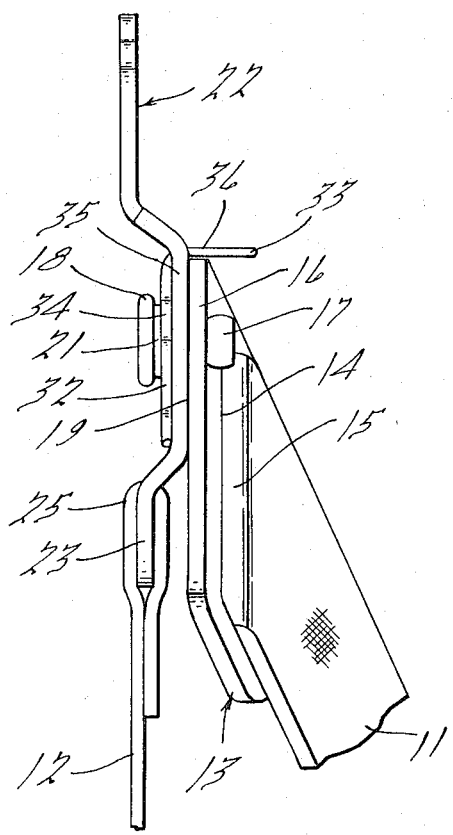
FIG. 2 is a side elevation of FIG. 1 in the direction of the arrow 2.

Referring now to FIG. 3 there is shown an anti-twist or rotation limiting device, generally designated 31. In its preferred form, the rotation limiting device is a hairpin shaped spring wire clip having symmetrical leg portions 32 joined by a bight 33. The leg portions 32 outwardly formed intermediate portions 34 adapted to form a retention means for holding the clip on the post 17 beneath the head 18, the formed portions 34 gripping or encompassing the collar 21 on the post 17 therebetween. As best seen in FIG. 3, the leg portions 32 in post mounted position lie in substantially parallel relationship to the end 16 of the plate 13, an intermediate plate portion 34 being interposed between the clip or rotation limiting device 31.

The bight 33 of the spring clip 31 is the terminal end of depending leg portions 36 that are angularly related to the plane of the leg portions 32. The leg portions 36 preferably are substantially at a right angle to the plane of the leg portions 32 and are spaced from the retention portions 34. In assembled relation the leg portions 36 project through the slot 28 in the intermediate plate portion 35 of the tongue 22 in close proximity to the apex end of triangular end portion 16 of the plate 13.

As the plate 13 and tongue 22 swivel relative to one another, the leg portions 36 of the rotation limiting device 31 freely moves around the apex of the triangular end 16 of the plate 13. The movement is limited, however, since the leg portions 36 will abut a side edge 37, depending on the direction of swivelling movement, of the triangular end portion. The permitted range of movement will be slightly in excess of 90° on each side of a center position. Since an excess of 360° of movement is required to cause twisting or roping of the harness 11, the rotation limiting device 31 will effectively prevent the undesirable condition from occurring.

A secondary benefit from the use of the rotation limiting device 31 is that it must be removed from the post 17 before the harness 11 can be uncoupled from the lap belt segment 12. It appears that a seat occupant would be encouraged to wear not only the lap belt but also the harness rather than go to the trouble of disassembling the rotation limiting device 31 from the coupled plate 13 and tongue 22.

It is to be understood this invention is not limited to the exact construction illustrated and described above, but that various changes and modifications may be made without departing from the spirit and scope of the invention as defined by the following claims:

We claim:
1. A coupling device for connecting a shoulder harness to a lap belt,
   the coupling device includes a plate adapted to be connected to one end of a shoulder harness,
   the plate having a substantially triangular end portion with an upstanding post at the apex of the triangle,
   the post having an enlarged head,
   and a tongue adapted to be connected to one end of a lap belt segment,
   the tongue having a retention slot intermediate its ends having interlocking engagement with the post, wherein the improvement comprises:
   a rotation limiting device having retention means substantially paralleling the plate and engaged with the post,
   and an angularly related leg portion,
   the leg portion projecting through the slot in the tongue,
   the leg portion being relatively movable around the plate triangular end portion for engagement with the side edges of the latter to limit the rotatability about the post of the plate relative to the tongue.

2. A coupling device according to claim 1, in which:

the rotation limiting device is a formed spring wire clip.

3. A coupling device according to claim 2, in which:

the spring wire clip is substantially hair pin shaped and the retention means comprises an expanded portion intermediate its ends encompassing the post,
   the angularly related leg portion being spaced from the retention means at the bight end of the clip.

4. A coupling device according to claim 3, in which:

the angularly related leg portion is substantially at a right angle to the retention means.

5. A coupling device according to claim 1, in which:

the angularly related leg portion is substantially at a right angle to the retention means.

* * * * *